United States Patent
Cahill et al.

(10) Patent No.: US 12,072,240 B2
(45) Date of Patent: *Aug. 27, 2024

(54) WAVELENGTH REFERENCE DEVICE

(71) Applicant: II-VI Delaware, Inc., Wilmington, DE (US)

(72) Inventors: Michael John Laurence Cahill, Melbourne (AU); Yang Li, Fuzhou (CN)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,871

(22) Filed: Apr. 17, 2023

(65) Prior Publication Data

US 2023/0288254 A1   Sep. 14, 2023

Related U.S. Application Data (63) Continuation of application No. 17/112,583, filed on Dec. 4, 2020, now Pat. No. 11,662,250.

(30) Foreign Application Priority Data

Oct. 23, 2020 (CN) .......................... 202011150029.X (51) Int. Cl.
  *G01J 3/02* (2006.01)
  *G01J 3/45* (2006.01)
  *H04B 10/25* (2013.01)

(52) U.S. Cl.
  CPC .......... *G01J 3/0297* (2013.01); *G01J 3/0218* (2013.01); *G01J 3/0286* (2013.01); *G01J 3/45* (2013.01); *H04B 10/25* (2013.01)

(58) Field of Classification Search
  CPC .......... G01J 3/0826; G01J 3/0291; G01J 3/45; H01S 5/0612; H01S 5/141; G01N 21/39; H04B 10/572; G02F 1/213
  See application file for complete search history.

(56) References Cited

U.S. PATENT DOCUMENTS

| | | | |
|---|---|---|---|
| 6,594,022 B1 | 7/2003 | Watterson et al. | |
| 6,985,281 B2 | 1/2006 | Wagner et al. | |
| 8,867,929 B2 | 10/2014 | Dietz et al. | |
| 9,143,229 B1 | 9/2015 | Cahill | |
| 9,628,174 B2 | 4/2017 | Cahill et al. | |
| 10,148,383 B2 | 12/2018 | Cahill | |

(Continued)

FOREIGN PATENT DOCUMENTS

WO   2022002730 A1   1/2022

*Primary Examiner* — Michael A Lyons
(74) *Attorney, Agent, or Firm* — Blank Rome LLP (57) ABSTRACT

Described herein is a wavelength reference device comprising a housing defining an internal environment having a known temperature. A broadband optical source is disposed within the housing and configured to emit an optical signal along an optical path. The optical signal has optical power within a wavelength band of interest. An optical etalon is also disposed within the housing and positioned in the optical path to filter the optical signal to define a filtered optical signal that includes one or more reference spectral features having a known wavelength at the known temperature. The device also includes an optical output for outputting the filtered optical signal.

20 Claims, 11 Drawing Sheets

(56) References Cited

U.S. PATENT DOCUMENTS

| | | |
|---|---|---|
| 10,215,624 B2 | 2/2019 | Cahill |
| 10,677,994 B2 | 6/2020 | Frisken |
| 11,662,250 B2 * | 5/2023 | Cahill ..................... G01J 3/26 |
| | | 356/454 |
| 2003/0087121 A1 | 5/2003 | Domash et al. |
| 2003/0151818 A1 | 8/2003 | Wagner et al. |
| 2006/0065834 A1 | 3/2006 | Kuznetsov et al. |
| 2011/0080591 A1 | 4/2011 | Flanders et al. |
| 2011/0149365 A1 | 6/2011 | Cho et al. |
| 2012/0026503 A1 | 2/2012 | Lewandowski et al. |
| 2012/0257210 A1 | 10/2012 | Whitney et al. |
| 2015/0162723 A1 | 6/2015 | Daiber |
| 2017/0005729 A1 | 1/2017 | Cahill et al. |
| 2017/0373463 A1 | 12/2017 | Narumi et al. |
| 2021/0214214 A1 | 7/2021 | Sànchez |

* cited by examiner

WAVELENGTH REFERENCE DEVICE

CROSS-REFERENCE TO RELATED APPLICATIONS

The present application is a continuation of U.S. patent application Ser. No. 17/112,583 filed Dec. 4, 2020. The aforementioned application is hereby incorporated by reference in its entirety.

FIELD OF THE DISCLOSURE

The present application relates to optical calibration and in particular to a wavelength reference device.

Embodiments of the present disclosure are particularly adapted for frequency calibration of optical devices. However, it will be appreciated that the disclosed subject matter is applicable in broader contexts and other applications.

DESCRIPTION OF RELATED ART

A wavelength reference device is an optical component or combination of components that provides an optical output with known frequency characteristics. Wavelength reference devices are typically used to measure the frequency error of optical spectrum measurement equipment such as spectrometers, optical spectrum analyzers (OSAs) and optical channel monitors (OCMs).

A wavelength reference device comprises an optical source, such as a light-emitting diode (LED) or superluminescent light-emitting diode (SLED), and an optical reference filter, such as a gas absorber, notch filter(s), transmission filter(s) or Fabry-Perot etalon, which has frequency peaks (or notches) that are highly stable with temperature.

Conventional wavelength reference devices are application specific and each component has to be individually designed, assembled and tested. Typically the components are interconnected by fiber pigtails that have to be optically spliced together. Although these application specific devices can meet stringent frequency accuracy requirements, the cost of individual component assembly (e.g. mechanical packaging, collimating optics) and time to assemble the devices can be prohibitive on a large scale. Furthermore, significant effort is required to minimize temperature dependence of the filter and valuable space is required for fiber management to properly connect the components. In addition, it can be difficult to calibrate the wavelength reference device separate from the rest of the optical spectrum measurement equipment and the filter peak (notch) frequency can be very sensitive to alignment of collimated light.

Thus, the inventors have identified that current wavelength reference device designs do not adequately meet the needs of emerging applications in relation to low cost, small size, frequency accuracy and standalone calibration, particularly for OCMs.

Any discussion of the background art throughout the specification should in no way be considered as an admission that such art is widely known or forms part of common general knowledge in the field.

SUMMARY OF THE DISCLOSURE

In accordance with one aspect of the present disclosure, there is provided a wavelength reference device comprising: a housing defining an internal environment having a known temperature; a broadband optical source disposed within the housing and configured to emit an optical signal along an optical path, the optical signal having optical power within a wavelength band; an optical etalon disposed within the housing and positioned in the optical path to filter the optical signal to define a filtered optical signal that includes one or more reference spectral features having a known wavelength at the known temperature; and an optical output for outputting the filtered optical signal.

In accordance with another aspect of the present disclosure, the wavelength reference device disclosed above and described herein can be used in an apparatus to process signal input. The apparatus can comprise: an input of the apparatus receiving the signal input; a signal detection and processing module configured to detect and process the signal input; a module having the disclosed wavelength reference device disposed in optical communication with the input, the device being configured to produce a wavelength reference; and at least one controller in signal communication with at least the signal detection and processing module and the wavelength processing module, the controller configured to control the wavelength reference module and configured to calibrate the signal detection and processing module based on the produced wavelength reference.

BRIEF DESCRIPTION OF THE DRAWINGS

Example embodiments of the disclosure will now be described, by way of example only, with reference to the accompanying drawings in which.

DESCRIPTION OF THE DISCLOSURE

Figure 1:
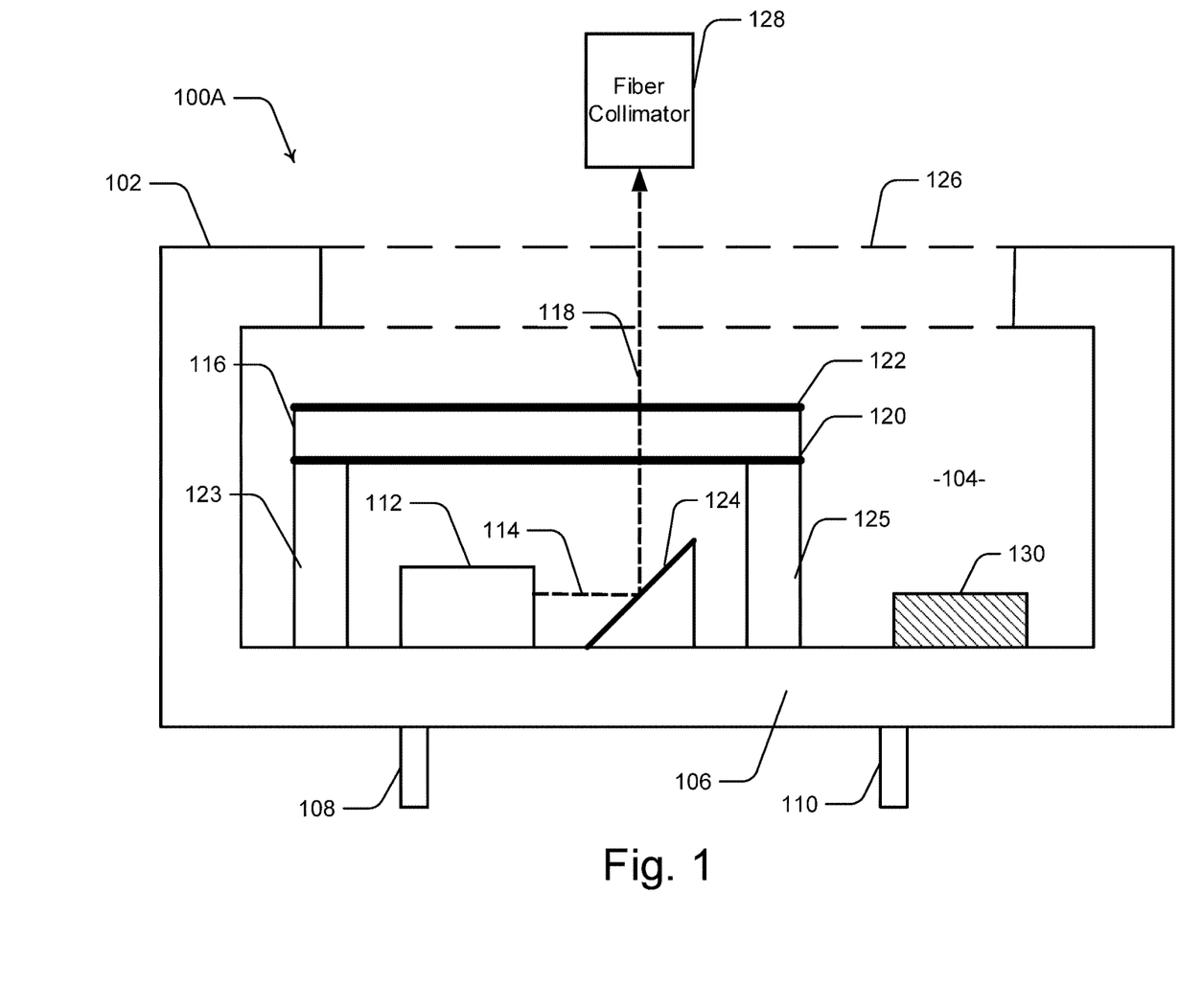
FIG. 1 is a schematic side view of a wavelength reference device according to a first embodiment.

Referring initially to FIG. 1, there is illustrated an integrated wavelength reference device 100 comprising a housing 102 defining an internal environment 104 having a known temperature. The device is termed integrated as each of the components are integrated into a single package which provides for a standalone device. That is, the wavelength reference device 100 does not need to leverage components from the optical equipment being calibrated.

Housing 102 is preferably formed of a transistor outline (TO) package, such as a TO-46 package, and may be either cylindrical or rectilinear in profile. In addition to providing a sealed protective housing for internal components, the TO package provides for simple mounting of electrical components onto a TO header 106, which forms a base of housing 102. TO header 106 includes a plurality of internal electrical pins (not shown) for electrically mounting electrical components thereto and which are connected to external control pins 108 and 110. Pins 108 and 110 are able to be connected to a controller such as a digital processor for powering and providing control signals to components of device 100.

Device 100 includes a broadband optical source in the form of a superluminescent diode (SLED) 112 disposed within TO header 106 within housing 102 and configured to emit an optical signal 114 along an optical path through device 100 to an optical output. SLED 112 may be any suitable device providing a power spectral density of sufficient magnitude across the wavelength range of interest. For example, for the optical transmission C-band, power density between 1525 nm to 1570 nm may be preferable. In other embodiments, SLED 112 may be replaced with other types of broadband optical sources such as one or more LEDs or amplifier spontaneous emission (ASE) from an optical amplifier.

Figure 2:
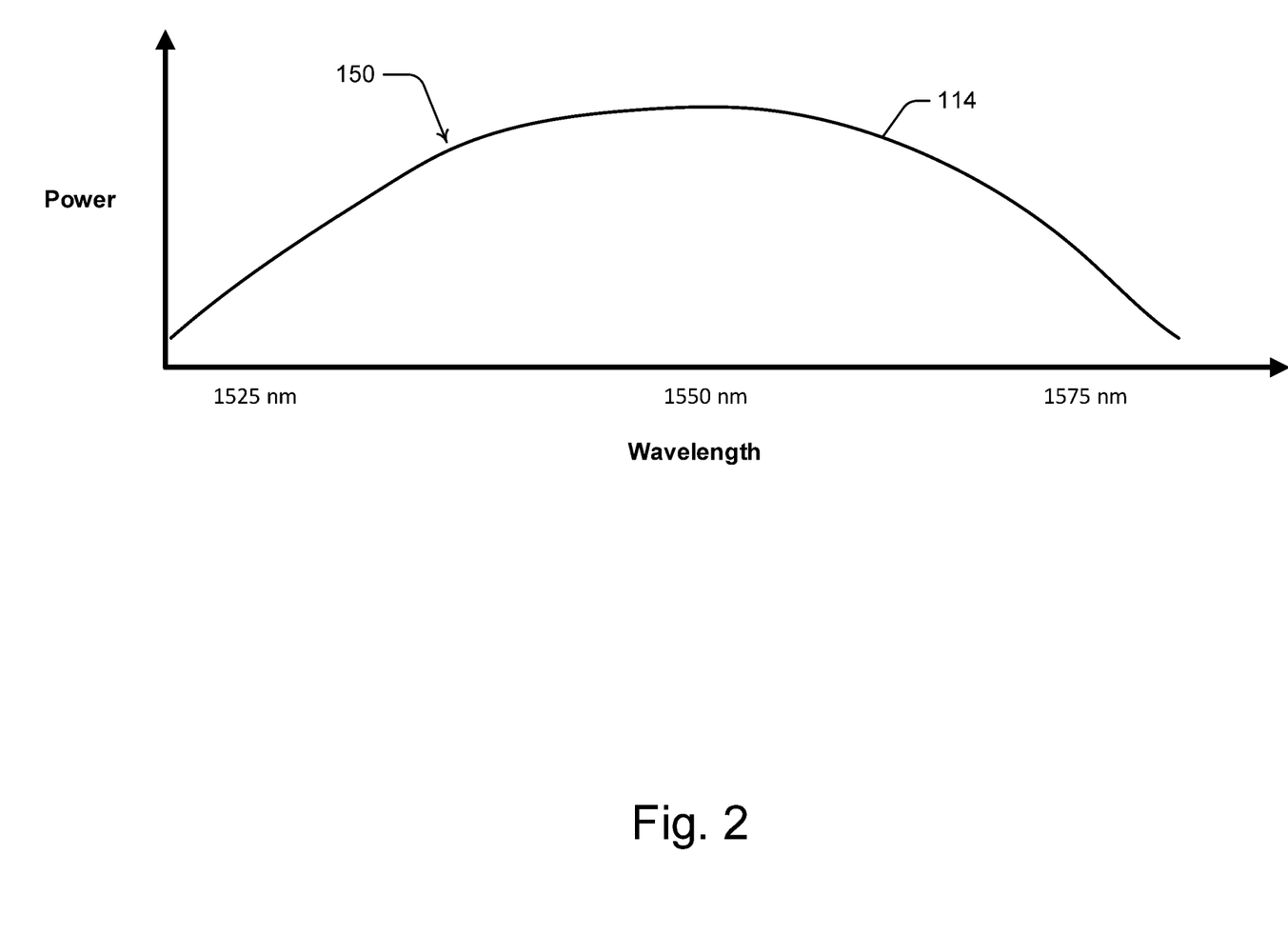
FIG. 2 is an exemplary spectrum of an optical signal generated by a superluminescent diode.

Referring to FIG. 2, there is illustrated an exemplary spectrum 150 of optical signal 114 generated by SLED 112. Spectrum 150 has a spectral profile extending between 1525 nm and 1575 nm with a center wavelength around 1550 nm.

Referring again to FIG. 1, device 100 also includes an optical reference filter or optical etalon 116 disposed within housing 102 and positioned in the optical path to filter the optical signal 114 to define a filtered optical signal 118. Filtered optical signal 118 includes one or more reference spectral features having a known wavelength at the known temperature in the form of one or more repeating spectral peaks of the etalon's resonant wavelengths.

The absolute wavelength of these spectral peaks are registered using a separate spectral measurement device such as an OCM or wave meter in an initial instrument calibration procedure. This calibration procedure is performed after the assembly of the wavelength reference component 100.

Etalon 116 is preferably formed of a glass substrate having a pair of parallel disposed sides on which glass mirrors 120 and 122 are deposited. The glass substrate has a finite thickness such that mirrors 120 and 122 are separated by a fixed distance L. The glass substrate between mirrors 120 and 122 has a refractive index that is known to a high degree of accuracy. In some embodiments, etalon 116 may be formed of other materials other than glass. In some embodiments, etalon 116 may be formed of two parallel plates separated by an air gap.

In the illustrated embodiment, SLED 112 is positioned horizontally on TO header 106 to emit optical signal 114 horizontally. A turning mirror 124 is disposed on header 106 and angled at approximately 45 degrees to direct the horizontally propagating optical signal 114 vertically onto etalon 116. Mirrors 120 and 122 of etalon 116 are disposed substantially horizontally such that optical signal 114 is incident perpendicularly onto an outer surface of mirror 120.

Mirrors 120 and 122 of etalon 116 define a resonant cavity within which the optical signal 114 can resonate. Wavelengths that are an integral multiple of the mirror spacing L will resonate within etalon 116 and will dominate the power of the signal that passes through mirror 122. These resonant wavelengths form the filtered optical signal 118.

Figure 3:
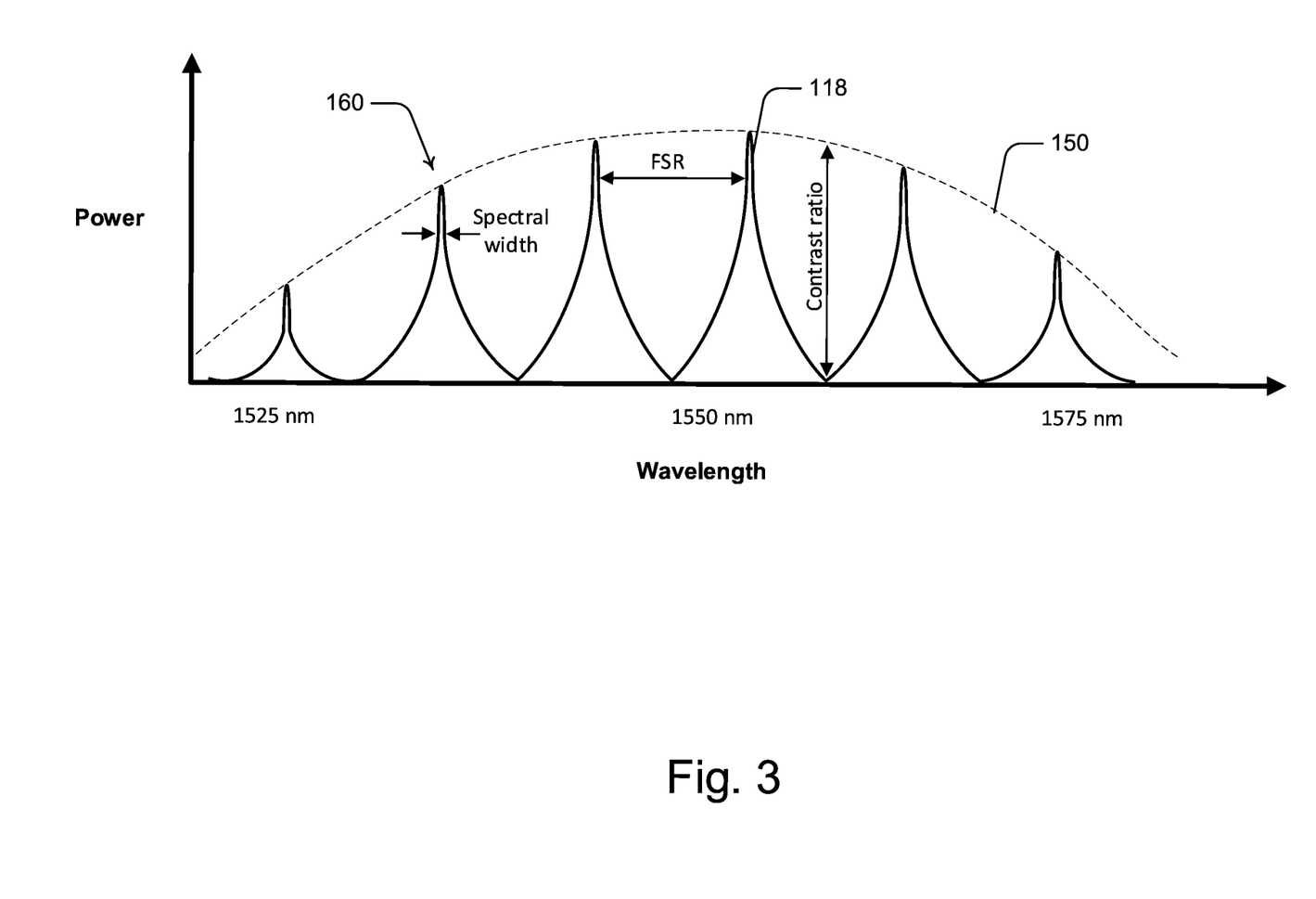
FIG. 3 is an exemplary spectrum of the optical signal filtered by a Fabry-Perot etalon.

Referring now to FIG. 3, there is illustrated an exemplary spectrum 160 of the filtered optical signal 118. The periodic peaks of the solid line indicate the resonant wavelengths of etalon 116 while the dashed line indicates the envelope defined by the spectrum 150 of SLED 112. The peaks of the signal occur at known frequencies that are temporally stable at a given temperature. The spectral peaks are spaced apart by a constant spectral width called the "free spectral range". The free spectral range is specific to an etalon and is defined by:

$$\Delta\lambda(FSR) = \frac{\lambda^2}{nL}$$

Where $\lambda$ is the wavelength of light incident onto the etalon (optical signal 114), n is the refractive index of the media within the cavity of the etalon and L is the length of the cavity (distance between mirrors 120 and 122). The media between mirrors 120 and 122 is glass in the illustrated embodiment but may be air or other materials having a known refractive index in other embodiments. Given this known formula, the wavelength of each spectral peak of the filtered optical signal 118 can be established by a calibration process using a wave meter or OSA and used as reference spectral features to reference and calibrate optical devices such as an OCM. As the temperature of the etalon changes, the refractive index changes, which affects the FSR. This is visible as a wavelength shift of the peaks, which can be measured. Typical glass etalons have temperature dependence of approximately 1.5 GHz/° C. This temperature dependency is accounted for in system 100 as described below.

The parameters of the filtered optical signal 118 may be defined during manufacture to suit a corresponding application. The FSR of the spectrum is determined primarily by the width of etalon 116 and the material used to define the cavity (e.g. glass having a refractive index of about 1.5). The FSR is chosen such that a plurality of wavelength peaks (e.g. 10 or more) are present across the desired spectrum to be referenced as each spectral peak represents a sample point of known wavelength to characterize an optical spectrum. By way of example, in a telecommunications application, across spectrum of 4-5 THz, an FSR between 100 GHz and 200 GHz may be chosen to provide 20-50 reference spectral peaks of known wavelength.

The width of each spectral peak (typically characterized by the Full Width at Half Maximum—FWHM) can also be controlled to a degree by the reflectivities of mirrors 120 and 122. Typically both mirrors will be highly reflecting having a reflectivity of greater than 50%. However, higher reflective mirrors (e.g. greater than 90% reflectivity) will produce narrower spectral peaks and higher contrast ratio in filtered optical signal 118, thereby providing more accurate wavelength resolution. But, as a trade-off, higher reflective mirrors will increase the insertion loss and therefore result in smaller peaks.

The FSR, spectral width and contrast ratio are key parameters that can be set during etalon manufacture to suit a specific application of device 100. By way of example, one suitable device may provide a FWHM spectral width of less than 5 GHz, a contrast ratio of at least 10 dB and an FSR or around 100 GHz.

For efficient packaging of device 100, etalon 116 is positioned above SLED 112 and turning mirror 124, and held in place by support struts 123 and 125. However, this need not be the case and different orientations and configuration of SLED 112 and other components is possible.

Although the outer surfaces of mirrors 120 and 122 are illustrated as being parallel to the other surfaces in the package (e.g. base 106 and window 126), in some embodiments, the outer surfaces of mirrors 120 and 122 are slightly angled by a fraction of a degree to reduce an interference pattern resulting from reflections off other surfaces.

The filtered optical signal 118 is directed through a transparent window 126 in an upper region of housing 102. Window 126 forms an optical output for outputting filtered optical signal 118 from device 100. Transparent window 126 is preferably formed of glass material that is highly transparent at the wavelength of the broadband optical source 112.

Filtered optical signal 118 is typically coupled to a fiber collimator 128 for coupling the signal to the system that is designed to utilize this wavelength reference, such as an OCM. In some embodiments, window 126 or housing 102 includes a coupling structure (not shown), such as a fiber connector, to connect a fiber to device 100. In some embodiments, transparent window 126 includes a lensing structure (not shown) to focus, partially focus, collimate or partially collimate the filtered optical signal 118 to more efficiently couple it into the fiber collimator 128.

SLEDs and other broadband sources typically have a wide divergence (up to 10's of degrees) and collimating/focusing lenses or mirrors can help confine the light for more efficient coupling to a pigtailed fiber. In some embodiments, collimator 128 may be formed integrally with housing 102 and sold as a single package with device 100 and optionally a length (pigtail) of optical fiber. In some embodiments (not illustrated), device 100 includes a connector for connecting an optical fiber or collimator 128 to housing 102 adjacent the transparent window 126.

In device 100, the optical path between SLED 112 and etalon 116 is fixed in space with no moving components. This fixed optical path provides for a very stable frequency output from device 100.

Knowledge of the temperature of internal environment 104 is important as the transmission spectrum of etalon 116 is temperature dependent. As such, the position of the spectral peaks in filtered optical signal 118 will vary depending on temperature. This temperature dependence of device 100 is calibrated initially by measuring the spectral peaks of filtered optical signal 118 across using an OSA or wave meter across a range of temperatures. In order to have knowledge of the temperature of internal environment 104 during operation of device 100, the temperature may be passively sensed using one or more temperature sensors, or the temperature may be actively set using a temperature control device such as a thermoelectric cooler (TEC) having heating and/or cooling capability (or other active heating or cooling device). Any passive or active temperature devices should be capable of operating within the operating temperature range of telecommunications equipment. For example, the devices should be operable within −5° C. to 70° C.

As noted, operation of device 100 depends on temperature. As disclosed in more detail below, a temperature component provides temperature control and/or temperature information for the operation of device 100. In this way, temperature can be controlled and/or known during use, so a suitable wavelength reference can be provided. As disclosed below, such a temperature component can include a thermistor in the housing 112, a deposited thermistor on the reference filter 116, a heating element in/on the housing 112, a deposited heating element on the reference filter 116, or any combination of these.

In device 100 of FIG. 1, a temperature sensor in the form of a thermistor 130 is mounted to TO header 106 within housing 102 and configured to sense the temperature of internal environment 104. Although other types of thermal sensor may be used, thermistors have the benefit of simplicity and low cost. This sensed temperature is fed to an external controller (not shown) of the broader optical instrument being referenced (e.g. OCM) that is connected to device 100 via pins 108 and 110. The external controller has a database or lookup table of the wavelength-temperature dependence of device 100 and uses the temperature information to determine the wavelengths of the spectral peaks in filtered optical signal 118. This simple passive temperature sensing avoids the cost associated with a thermoelectric controller.

Figure 4:
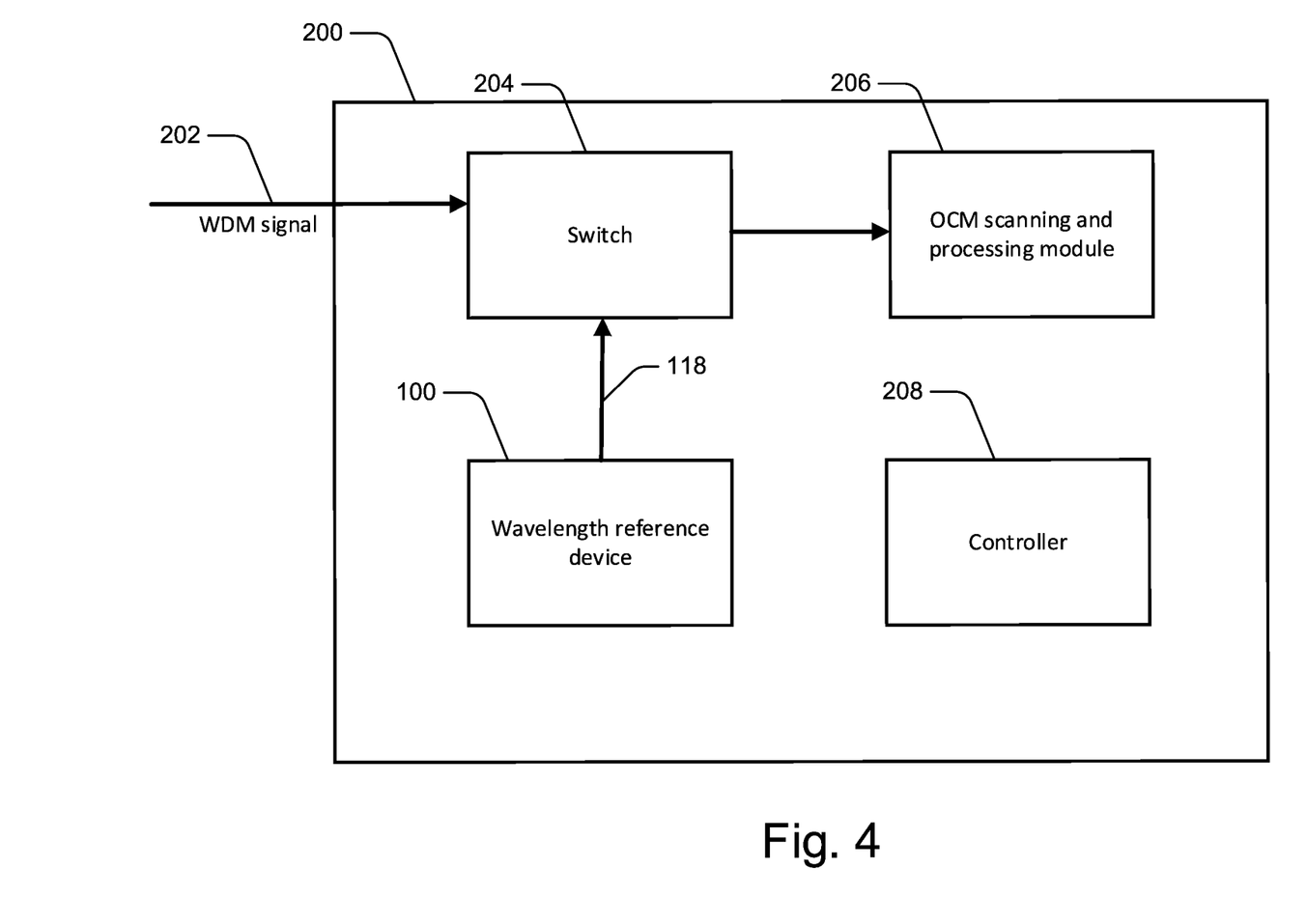
FIG. 4 is a schematic system diagram of an optical channel monitor device incorporating a wavelength reference device.

In operation, device 100 is incorporated into a broader optical measurement instrument, such as an OCM, as a module of that instrument. Referring to FIG. 4, there is illustrated a system diagram of an OCM 200 which incorporates wavelength reference device 100. OCM 200 can be similar to that disclosed in U.S. Pat. No. 9,628,174, which is incorporated herein by reference.

OCM 200 is configured to receive an incoming wavelength division multiplexed optical signal 202. Both WDM signal 202 and filtered optical signal 118 from device 100, which represents a wavelength reference signal, are coupled to an input or optical switch module 204, which is capable of switching the signals to be passed to a detection and processing module (i.e., a primary OCM scanning and processing module 206). Scanning and processing module 206 performs the primary spectral monitoring of the WDM channel spectrum. A controller 208 performs controlling functions of the OCM 200, including controlling switch 204 to switch between WDM signal 202 and wavelength reference signal 118, monitoring the temperature of internal environment 102 of device 100 to calibrate the spectral peaks of signal 118, setting the temperature of internal environment 102 (if active temperature control is included). To perform the various functions, controller 208 includes drivers for components like thermistors, TECs and the like. Controller 208 may represent an internal controller of the OCM 200 itself or a separate controller specific to the wavelength reference device.

As disclosed herein, wavelength reference device 100 is preferably a modular component having its integrate package of elements. This allows device 100 to be assembled, tested, and calibrated on its own independent of OCM 200 and then readily integrated directly into the circuitry and the optical path of OCM 200.

A number of variations to a wavelength reference device according to the present disclosure may be implemented and these are outlined below with reference to FIGS. 5 to 11. In subsequent embodiments, corresponding features of device 100 are designated with the same reference numerals for clarity.

Figure 5:
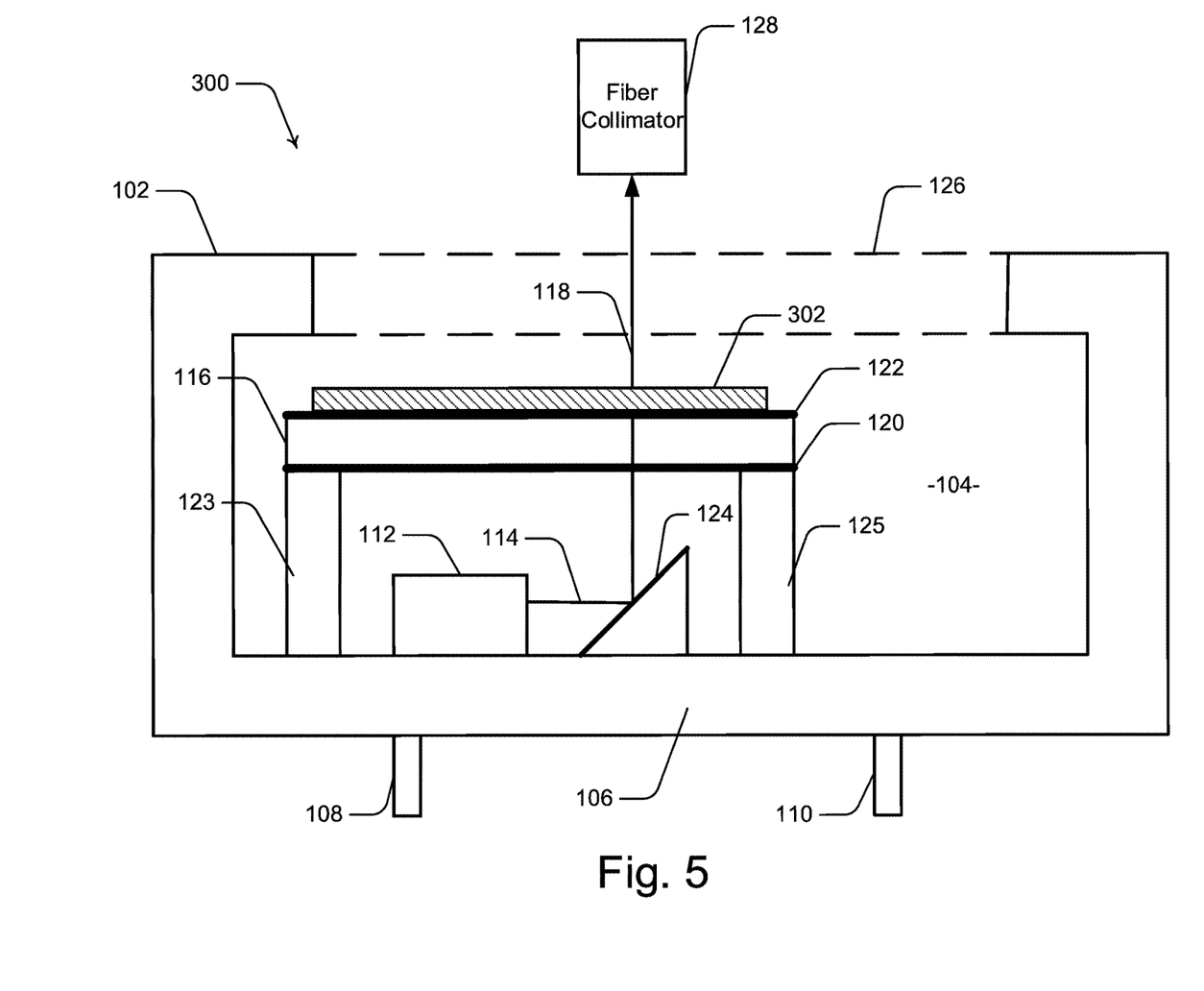
FIG. 5 is a schematic side view of a wavelength reference device according to a second embodiment.

Referring to FIG. 5, there is illustrated a second embodiment wavelength reference device 300. In device 300, passive temperature sensing is performed by a thermistor 302 that is deposited or mounted directly onto upper mirror 122 of the etalon 116.

In this embodiment, the direct temperature of etalon 116 may be measured, improving the accuracy of temperature calibration of the etalon spectral response and therefore wavelength of the spectral peaks in filtered optical signal 118. Furthermore, no standalone thermistor device is required, thereby reducing the number of overall components in the device.

Figure 6:
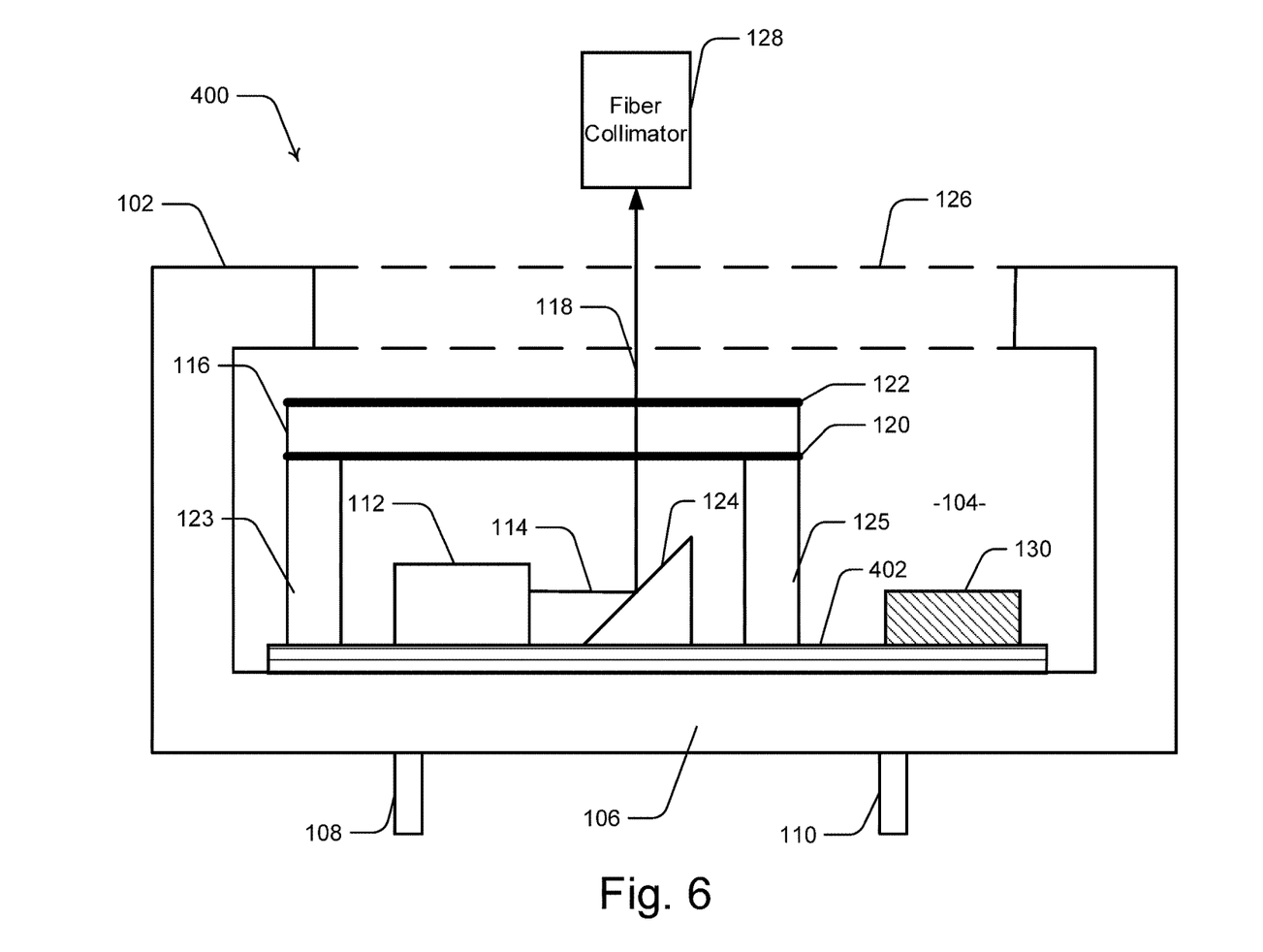
FIG. 6 is a schematic side view of a wavelength reference device according to a third embodiment.

In some embodiments, temperature control may also be actively provided by a temperature control device, such as a thermoelectric controller, a thermoelectric heater/cooler (TEC), or the like. Referring now to FIG. 6, there is illustrated a third embodiment wavelength reference device 400, which includes an active temperature control device in the form of a thermal source 402. This thermal source may be any controlled heating or cooling device and is controlled by a separate controller (e.g. controller 208 of FIG. 4) and may have either heating or cooling capability, or both heating and cooling capability.

Device 400 also includes a separate thermistor 130 for sensing the temperature within environment 104. However, in some embodiments, thermal source 402 includes an internal thermistor or other temperature sensor thereby avoiding the need for separate thermistor 130. Thermal source 402 is mounted within housing 102 directly onto TO header 106 for powering by electrical pins 108 and 110. Thermal source 402 forms a base upon which other components such as SLED 112, etalon 116, turning mirror 124 and thermistor 130. In this manner, setting the temperature of thermal source 402 provides for directly setting the temperature of all components above.

Together with an external controller (not shown), thermistor 130 and thermal source 402 provide for a complete temperature control loop in which the temperature of internal environment 104 can be set. In particular, external controller 208 of FIG. 4 can be configured to receive a temperature signal from thermistor 130 and, in response, send a control signal to thermal source 402 to switch on/off or increase/reduce the thermal output of thermal source 402 to adjust the temperature of environment 104. Where thermal source 402 includes temperature sensing capability, this feedback loop may be implemented directly by thermal source 402 in response to control signals from controller 208. The temperature control may be based on user-specified or other predefined temperature values for environment 104 which are conducive to efficient operation and accurate wavelength referencing.

Figure 7:
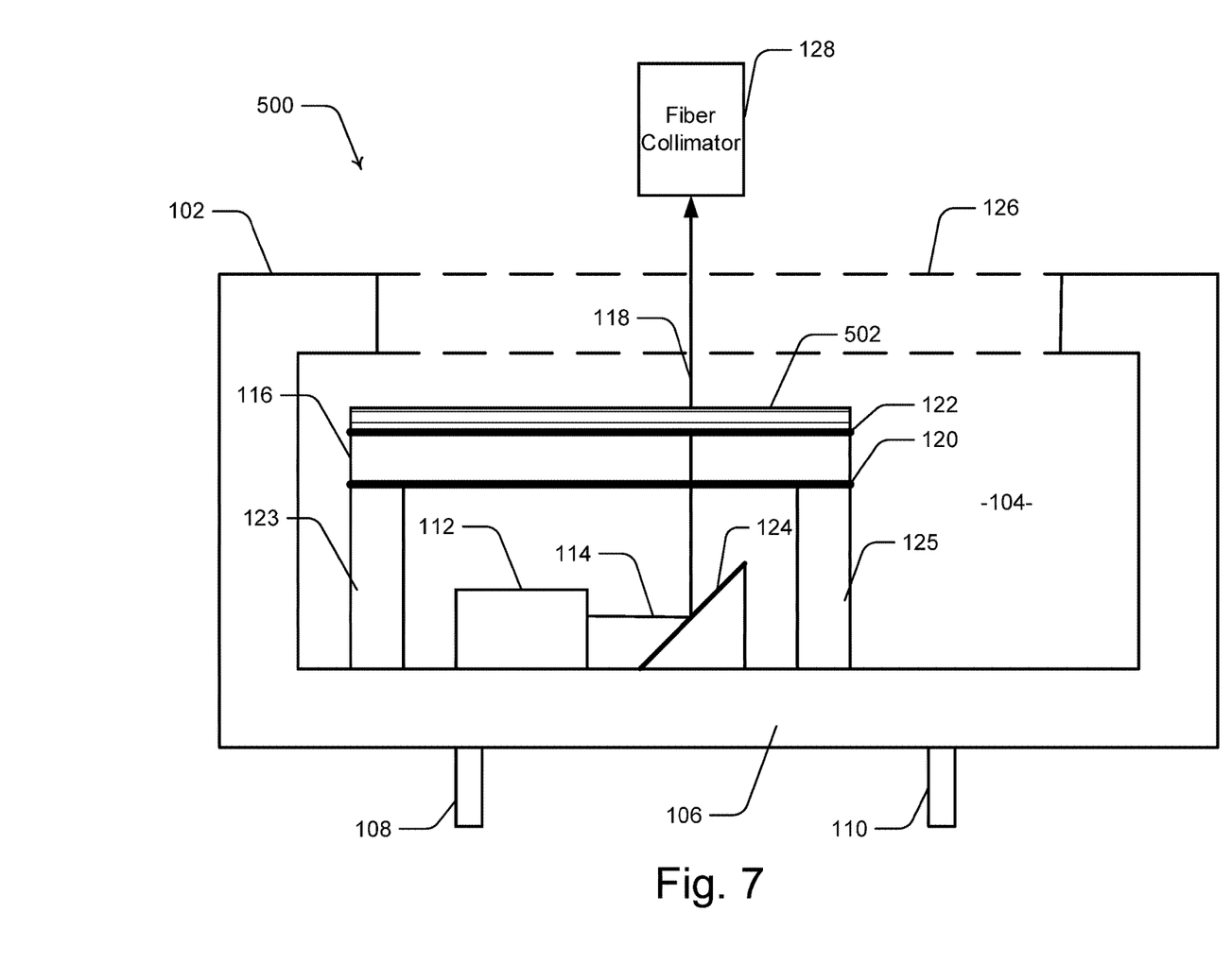
FIG. 7 is a schematic side view of a wavelength reference device according to a fourth embodiment

Referring now to FIG. 7, there is illustrated a fourth embodiment wavelength reference device 500. In device 500, a thermal source 502 is mounted directly onto upper mirror 122 of etalon 116, but located so that the optical path of filtered optical signal 118 is not blocked.

In this embodiment, the direct temperature of etalon 116 may be actively set by the thermal output of thermal source 502, improving the accuracy of temperature calibration of the etalon spectral response and therefore wavelength of the spectral peaks in filtered optical signal 118. The direct mounting of thermal source 502 onto etalon 116 also removes the need for passive sensing temperature by a separate thermistor or temperature sensor. However, thermal source 502 may also incorporate an internal thermistor or other temperature sensor to sense the temperature of etalon 116 and provide feedback to the external controller.

Figure 8:
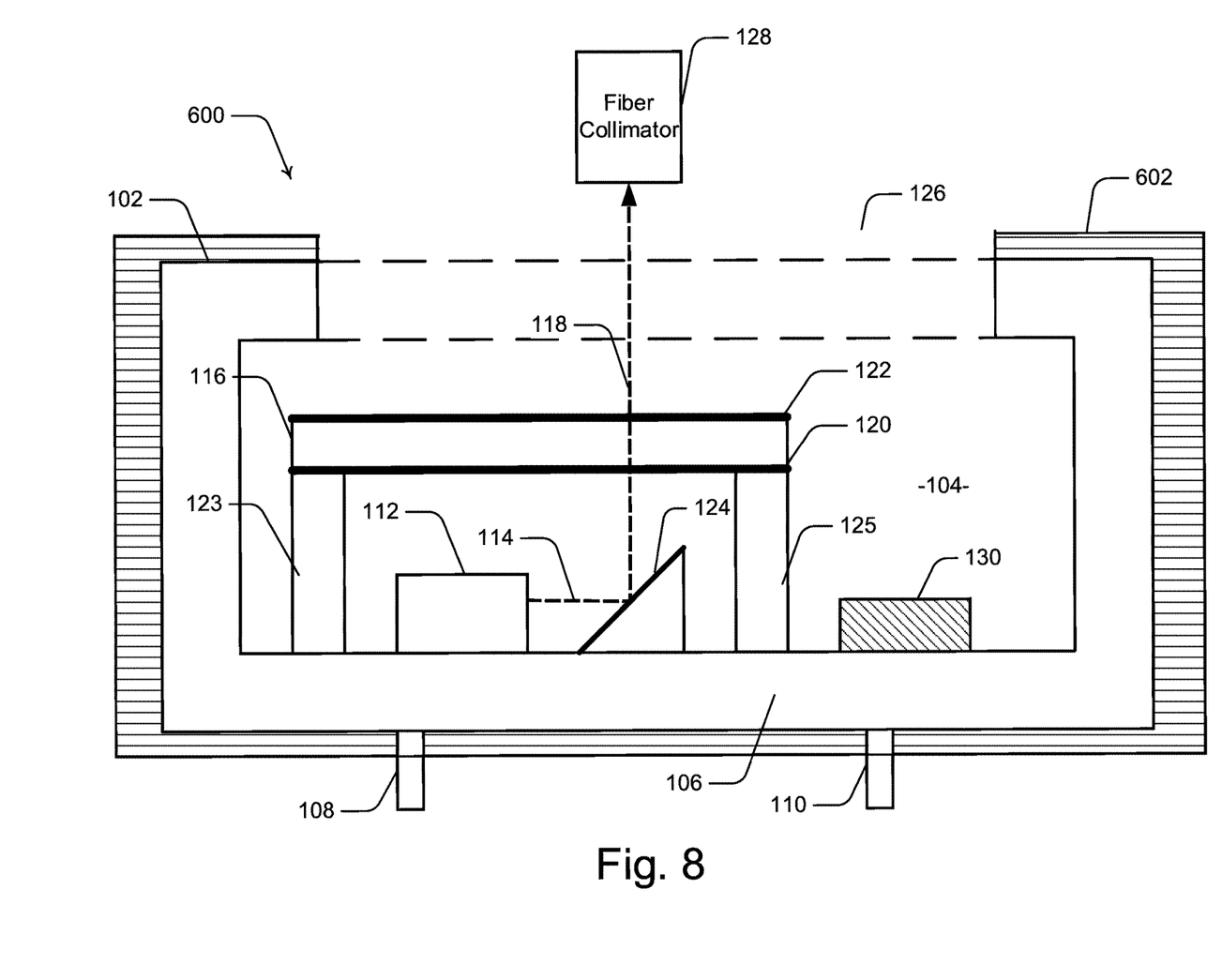
FIG. 8 is a schematic side view of a wavelength reference device according to a fifth embodiment

In some embodiments, the temperature control may be performed from outside housing 102. Referring now to FIG. 8, there is illustrated a fifth embodiment wavelength reference device 600 in which housing 102 is substantially surrounded by a temperature controlled device such as a thermoelectric controlled coating 602. Coating 602 may be mounted directly to an outside of housing 102 and controlled by an external controller (not shown) to provide a controlled thermal output to device 600. The temperature of internal environment 104 may still be sensed by thermistor 130. Through accurate temperature control, the temperature of internal environment 104 can be accurately set and the wavelength peaks of filtered optical signal 118 accurately known. As shown, a temperature sensor in the form of a thermistor 130 can be mounted in the internal environment 104 to measure the internal temperature according to the purposes disclosed herein. As illustrated, coating 602 is prohibited from entirely covering transparent window 126 so that the optical path of filtered optical signal 118 is not blocked. In some embodiments, coating 602 takes the form of a thermal blanket that can be wrapped around housing 102.

Figure 9:
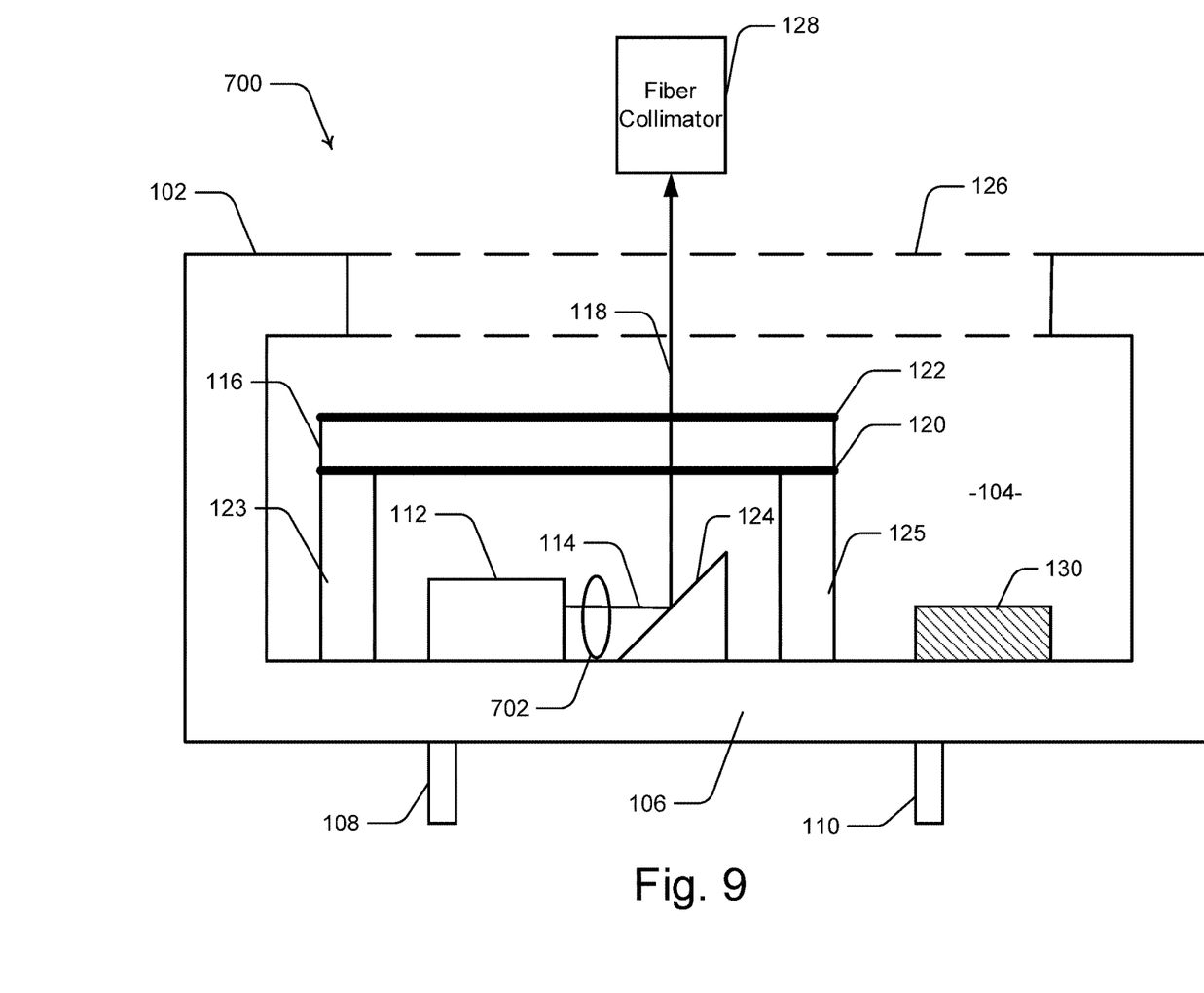
FIG. 9 is a schematic side view of a wavelength reference device according to a sixth embodiment.

Referring now to FIG. 9, there is illustrated a sixth embodiment wavelength reference device 700. Device 700 includes a collimating lens 702 disposed in the optical path between SLED 112 and etalon 116. Lens 702 is adapted to collimate or partially collimate the diverging beam of optical signal 114 emitted by SLED so that the rays are primarily directed perpendicularly onto etalon 116. This perpendicular or normal incidence produces sharper spectral peaks in the filtered optical signal, thereby improving the accuracy of the wavelength referencing. It will be appreciated that equivalent collimation may be performed by other optical elements or combinations of elements such as curved mirrors. In some embodiments, collimating lens 702 collimates or partially collimates optical signal 114 and transparent window 126 includes focusing power to focus the collimated filtered optical signal 118 into a coupled optical fiber.

Figure 10:
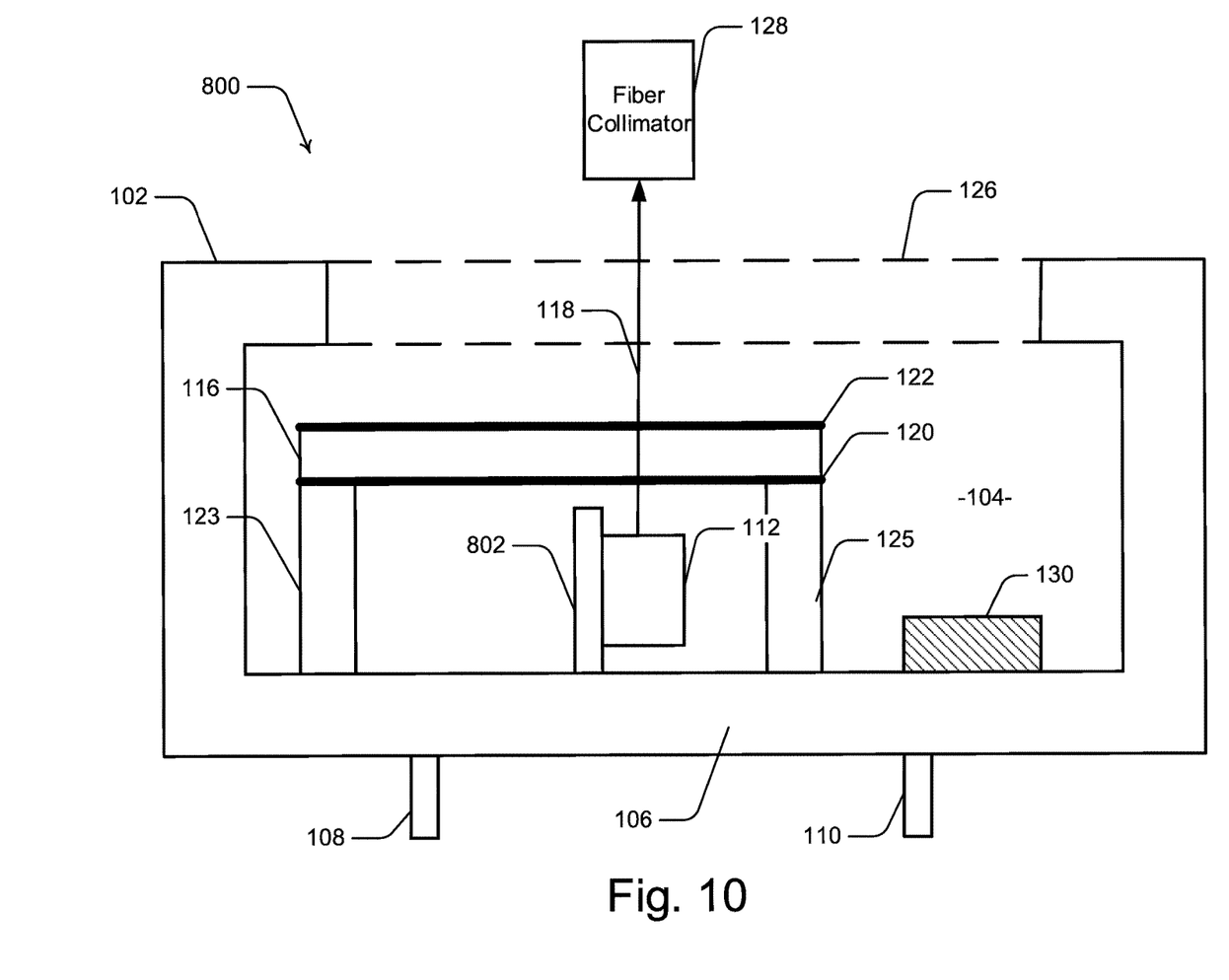
FIG. 10 is a schematic side view of a wavelength reference device according to a seventh embodiment.

Referring now to FIG. 10, there is illustrated a seventh embodiment wavelength reference device 800. In device 800, SLED 112 is mounted to housing 102 in a vertical configuration. In particular, SLED 112 is mounted vertically to a mount 802 so that the optical signal 114 is emitted substantially vertically. This design provides for a simple linear optical path from SLED 112 through etalon 116 and transparent window 126 to collimator 128. In some embodiments, device 800 also includes a collimating lens disposed in the optical path adjacent the broadband optical source 112.

Figure 11:
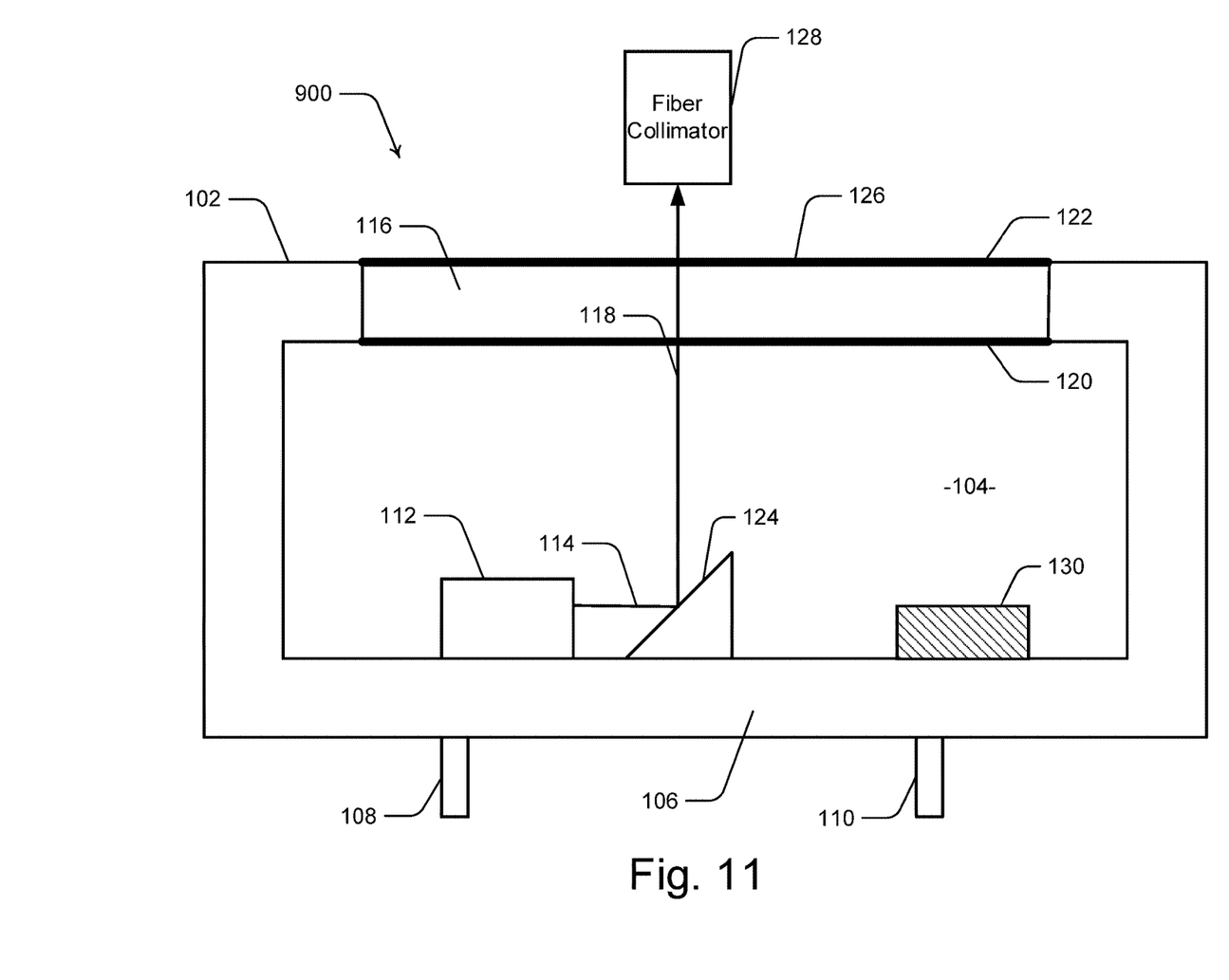
FIG. 11 is a schematic side view of a wavelength reference device according to an eighth embodiment.

Referring now to FIG. 11, there is illustrated an eighth embodiment wavelength reference device 900. In device 900, etalon 116 is integral with transparent window 126. That is, the internal and external sides of transparent window 126 respectively include etalon mirrors 120 and 122 formed thereon. This embodiment reduces the need for a separate etalon device, thereby reducing the number of components in the package and simplifying the assembly process.

It will be appreciated that combinations of the elements of the separate embodiments described above may be implemented. By way of example, a device having a vertically mounted SLED may be used in combination with a thermal source mounted to the TO header within the housing and having an etalon that is integrated within the transparent window of the housing. Therefore, the present disclosure is intended to encompass such combinations and modifications.

The above described wavelength reference devices can be produced from readily available components while providing high wavelength accuracy. In particular, the device can be integrated into a standard TO package such as a TO-46 package, providing a small spatial footprint when integrated into an optical instrument. The output of the package can include a window or lens, which may be one of several different designs. For example, the output can be a ball lens, a flat window, or an integrated lens. As noted above, the output of the package may include a fiber collimator for collimating the optical signal to a fiber for use in additional components of a system or apparatus. The device can be formed of a small number of components, which reduces the overall cost of manufacture. The device incorporates a fixed optical path, which provides for high frequency stability and a simple calibration process.

The device has a modular design with a single functional block and single optical output. This can support calibration and testing in isolation to other OCM components, thereby simplifying OCM calibration/testing and increasing yield.

INTERPRETATION

Reference throughout this specification to the term "frequency" in a relative sense such as a "frequency range", "frequency spectrum", "change in frequency", "frequency error" or the like is intended to be synonymous with "wavelength" as they are related by the constant relationship: speed of light=frequency×wavelength. The term "infrared" is used throughout the description and specification. Within the scope of this specification, infrared refers to the general infrared area of the electromagnetic spectrum which includes near infrared, infrared and far infrared frequencies or light waves.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities. In a similar manner, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. A wavelength reference device comprising:
   a housing defining an internal environment having a known temperature;
   an optical reference filter integral with the housing and configured to provide a calibrated wavelength reference having a known wavelength, the optical reference filter including a resonant cavity with a fixed separation between a first mirror that comprises an exterior surface of the housing and a second mirror that comprises an interior surface of the housing;
   a broadband optical source disposed within the housing and configured to emit an optical signal along an optical path through the optical reference filter, and
   an optical output configured to output the calibrated wavelength reference from the housing.

2. The device according to claim 1, wherein the housing comprises a transistor outline package.

3. The device according to claim 1, further comprising a temperature control device configured to control the known temperature.

4. The device according to claim 3, wherein the temperature control device is disposed within the housing, is disposed on an interior surface of the housing, or forms a base on which the broadband optical source is mounted.

5. The device according to claim 3, wherein the temperature control device comprises a thermal source having heating and/or cooling functionality.

6. The device according to claim 5, wherein the thermal source is mounted to a side of the optical reference filter or is mounted to an outside of the housing.

7. The device according to claim 1, further comprising a temperature sensor disposed within the housing.

8. The device according to claim 7, wherein the temperature sensor comprises a thermistor.

9. The device according to claim 8, wherein the thermistor is arranged onto a surface of the optical reference filter.

10. The device according to claim 1, wherein the broadband optical source comprises a superluminescent diode (SLED).

11. The device according to claim 1, further comprising lensing configured to collimate the calibrated wavelength reference.

12. The device according to claim 1, further comprising a connector connecting an optical fiber to the wavelength reference device.

13. The device according to claim 1, wherein the broadband optical source is mounted to a base of the housing in a horizontal configuration; and wherein the device comprises a turning mirror configured to direct the optical signal vertically onto the optical reference filter.

14. The device according to claim 1, wherein the broadband optical source is mounted to a base of the housing in a vertical configuration and is configured to direct the optical signal vertically onto the optical reference filter.

15. The device according to claim 1, wherein the optical path between the broadband optical source and optical reference filter is fixed in space.

16. The device according to claim 1, further comprising a collimating lens disposed in the optical path between the broadband optical source and the optical reference filter.

17. The device according to claim 1, wherein the optical output comprises a collimator disposed in the optical path outside the housing.

18. An apparatus to process signal input, the apparatus comprising:
    an input of the apparatus receiving the signal input;
    a signal detection and processing module configured to detect and process the signal input;
    a wavelength reference module having a device according to claim 1 disposed in optical communication with the input, the device being configured to produce a wavelength reference; and
    at least one controller in signal communication with at least the signal detection and processing module and the wavelength processing module, the controller configured to control the wavelength reference module and configured to calibrate the signal detection and processing module based on the produced wavelength reference.

19. The apparatus of claim 18, wherein at least the input, the signal detection and processing module, and the at least one controller comprise first components integrated into the apparatus; and wherein the wavelength reference module having the device comprises a second component being modular to the first components and being integrated into the apparatus.

20. The apparatus of claim 18, wherein the apparatus comprises an optical channel monitor (OCM); and wherein the input comprises an optical switch module being operable to switch the signal input to be passed to the signal detection and processing module.

* * * * *